Patented Aug. 28, 1934

1,971,910

UNITED STATES PATENT OFFICE 1,971,910

SOLID FLAVORING COMPOSITION

Carroll L. Griffith, Chicago, Ill., assignor to The Griffith Laboratories, Inc., Chicago, Ill., a corporation of Illinois No Drawing. Application March 2, 1931, Serial No. 519,686

15 Claims. (Cl. 99—11)

The present invention relates to solid flavoring materials or condiments in which volatile oils or materials are used as flavors. It has special reference to powdered solids embodying flavoring oils or spices such as those employed in admixture with meat, as in the manufacture of meat loaves, sausages, and the like.

Essential oils of spices, oleoresins of peppers and other similar liquid non-fibrous flavors have long been employed in making meat products. Owing to the concentrated form it has been a practice to dilute the flavors to facilitate use of them and to aid in quickly and more uniformly distributing the flavors into ground meat. Liquids and solids have been employed as diluents and carriers. Liquid spices in emulsified form are desired by some, while others prefer and demand powdered solid forms of which a certain bulk may enter into a given formula.

Reference is made to the Australian Patent No. 26,038 of 1925 which discloses the use of an edible powdered soluble or insoluble solid as a vehicle and carrier for oils, such as may be used for flavoring various materials including sausages. Dry milk powder, flour and the like are mentioned as vehicles. Reference is also made to the U. S. Patent No. 988,213 issued to Shepard and Maywald, disclosing sugar as a vehicle and diluent employed with glycerine as an agent to make the mixture hygroscopic, and to absorb the flavoring oils. Reference is also made to the Allen U. S. Patent No. 1,781,154 employing seasoning materials and sugar alone as the vehicle.

All the prior art above referred to has disadvantages. Mixtures of the oils into a vehicle such as sugar, starch, milk powder, without other ingredients are not very permanent. The essential oils are volatile and readily evaporate. On exposure of the composition to the air it is readily observable that the oils disappear leaving areas of the oil-free vehicle and areas of oil-carrying vehicle. A vehicle, such as sugar dries to form a white dry surface characteristically different from the internal appearance where the sugar is coated with oil. The use of glycerine in a measure slows down the evaporation of the flavoring oils, but on exposure the hygroscopic glycerine takes on moisture from the air and forms a water-glycerine mixture which is not a solvent for the flavoring oils. Such a mixture tends readily to dissolve the sugar and to release the flavoring oils to exposure for evaporation. In addition, the absorption of too much water may make the product lumpy, and such lumps may not be broken up in mixing of the product with ground meats.

The use of glycerine has its advantages and its disadvantages. In the present invention I retain the advantages secured by the use of glycerine and eliminate the disadvantages, and accomplish this by using a less proportion of glycerine and by using a new ingredient. Or in other words, I replace part of the glycerine with a different ingredient which performs the advantageous functions of glycerine without exhibiting the disadvantageous characteristics of glycerine. The lesser proportion of glycerine which is present in the composition is sufficient to secure the same advantages of a larger proportion of glycerine, and is insufficient to produce the disadvantageous results of a larger proportion.

One object of the invention is the production of a flavoring composition containing a solid finely divided edible vehicle or diluent, volatile flavoring ingredients, a nonvolatile edible oil as a fixative, and a hygroscopic substance.

Another object of the invention is the use of corn oil as a water insoluble fixative and a hygroscopic substance.

Still another object of the invention is the use of a non-volatile, non-hygroscopic edible oil as a fixative, and a hygroscopic substance such as glycerine or glycerine substitutes.

I have discovered that the retention of the flavoring oils by the carrier is greater if there is incorporated into the mixture of carried oils, an oil which is non-volatile. The mixture of oils is carried by the particles of the vehicle in whatever manner the vehicle permits, but the volatile essential oils are present in solution in the fixative oil, and the tendency to evaporate is materially decreased. I do not claim that the fixative is absolute in function, but it does retard the loss of strength of the product on standing and on exposure. Particularly on long exposure, the appearance of the product is not altered at the surface, for, although the flavoring oils may be lost, the fixative oil remains and preserves at the surface the same physical appearance which characterizes the interior. In addition the fixative oil remaining on the carrier at the exposed or top portion of a confined mass acts as a filter or absorber for vapors arising from below the surface. . Oils have a high tendency to absorb flavors, and such absorption retards the loss of flavors from the composition. It may be contrasted with a mixture without a fixative oil. Such a mixture will produce a dried-out layer of sugar or other vehicle at an exposed surface, which layer presents no barrier to the escape of vapors from below it. Such particles coated with a fixative oil as in this invention do present a barrier, and having absorbed the vapors hold them more tightly against evaporation.

As a hygroscopic substance I use an edible material which holds a certain amount of water so that in the composition there is water to provide water vapor. The presence of water vapor in the voids of the mass and in any space over the mass, as in a container, naturally lessens the proportion of space that may be occupied by volatile vapors of the essential oils and flavors. This lessens the effective vapor pressure of said volatile oils and flavors in accordance with the amount of water vapor present. Such action materially lessens the tendency of the volatile oils to vaporize and escape.

As a suitable hygroscopic substance I employ a liquid which may or may not mix with another, such as the fixative oils, or the essential oils, oleoresins or other flavors. It is not necessary that the hygroscopic substance have the property of mixing with other ingredients. I prefer glycerine, but may use ethylene glycol, which is substantially the same in the desired physical properties which I use in my composition. Both are sweet syrupy liquids which are hygroscopic, and are examples of glycolic substances, of which there are others. Too large a proportion of glycerine or its substitutes may cause too much wetting of the solid vehicle by aqueous material and thus cause lumping of the product. Glycerine itself, as commercially obtained on the market, may hold in it some flavoring materials, and in this event and in this respect it performs the desired function of my fixative, but it is subject to dilution by taking on water, and then it may reach a point where it releases such oils, so that it no longer performs the functions of a fixative. A small proportion of glycerine is sufficient to introduce and maintain water in the composition, and this may be effectively accomplished without having present sufficient glycerine, or its equivalent, to produce a tendency to cake. Since the fixative function is performed by material other than the glycerine, or its equivalent, a much smaller quantity of glycerine may be employed than has been used heretofore, and the smaller quantity effectively provides the balance of water in the mass.

As a vehicle I may use sugar, starch, milk powder or other edible soluble or insoluble substance. Sugar is preferred for a sausage flavoring composition, and is one of the substances approved by the U. S. Government inspection divisions. The sugar may be coarse or finely divided, preferably the latter. When coarse sugar is used it may be ground finer in the presence of the total mixture. The flavors, the fixative, and the hygroscopic substance may be mixed into a small quantity of the required bulk of finely divided sugar, and this mixture diluted by mixing in the remaining portion of the bulk.

As a fixative I may use any edible or harmless oil, such as corn oil, cottonseed oil, peanut oil, refined mineral oil and the like, and may vary the quantity within wide limits. The oil must be a solvent for one or more of the volatile ingredients, must not be a solvent for the vehicle, and must be relatively stable upon exposure. Although I have herein called the fixative oil a non-volatile oil, I refer to a practical interpretation, it being well known that mineral oil is distillable at higher temperatures, but is practically non-volatile at ordinary temperatures. It is to be noted that the glycerine, or its equivalent may perform a fixative function in addition to the special fixative.

As flavoring oils, I may use mixtures of common ingredients depending upon the purpose for which the flavor is to be used. Essential oils of cloves and other spices, and the oleoresins of spices may be employed. Fruit and nut flavors are not excluded and may be used with or in place of spices and the like.

As an illustrative example I may use to 100 parts of vehicle, up to about 8 parts of carried material, including the flavors, the fixative and the hygroscopic agent, where the latter is liquid in character. Where the hygroscopic agent is not liquid in character, and is a solid, like magnesium chloride, the liquid carried by the solid may be present at least up to about 8% of solid. I do not limit the proportion to 8% carried liquid, because the carrying power of the solid vehicle varies with its character. Milk powder, starch and the like are far more absorptive as particles than are sugar crystals, however fine. In addition, the carrying power varies with the degree of fineness of the solid, irrespective of its character, giving capillary spaces between particles, which spaces increase the capacity to hold liquids. It is a matter of good judgment and experiment to determine the limiting proportions according to the materials employed. I consider that 8 parts of carried liquid in 100 parts of finely ground cane sugar makes a satisfactory composition.

In such a composition I aim to have about 5 parts of volatile flavoring ingredients, about 1 part non-volatile fixative oil, like corn oil, and from 1 to 2 parts of liquid hygroscopic substance like glycerine.

In practice, the proportions are dictated by practical considerations, the quantities of flavoring materials and of vehicle being determined by formula and strength requirements for special purposes or for special users.

The formula for using the seasoning composition and the user bear no relation to the fixative and the hygroscopic agent, and these may be varied in the composition without affecting its strength to the user. The manufacturer of the composition may vary the percentage of fixative and watering agent in accordance with the conditions to which the composition is to be subjected, as in storage, transit, or particular use by a meat packer.

To make a sausage flavoring composition embodying this invention the following materials may be employed:

No. 1

| | Parts |
|---|---|
| Vehicle | |
|   Powdered sugar | 100 |
| Fixative | |
|   Corn oil | 1 |
| Hygroscopic agent | |
|   Glycerine | 1 to 2 |
| Seasoning materials | |
|   Blended mixture | 5 |

No. 2

| | Parts |
|---|---|
| Vehicle | |
|   Milk powder | 100 |
| Fixative | |
|   Corn oil | 1.5 |
| Hygroscopic agent | |
|   Ethylene glycol | 1 to 3 |
| Seasoning materials | |
|   Blended mixture | 5 |

The corn oil of the above examples does not readily mix with glycerine or with glycol, but since this is not essential to the present invention, it is immaterial. The glycerine or the glycol may perform the function of introducing and holding water vapor, and in certain instances may perform a fixative function, which is not necessary because such function is effectively performed by the corn oil.

Mixtures according to this invention are moist and oily solids which do not cake, which have a high retentive power for volatile ingredients contained therein, and which preserve a uniformity of appearance internally and externally in the event they are unduly exposed to evaporation. They are free flowing, and readily mixable with other ingredients to be flavored.

Various seasoning materials may be employed as is well known in the art. Among the volatile seasoning materials available for blending a flavor for meats and sausages are:

| | |
|---|---|
| Oleoresins of pepper | Oil of caraway |
| Oleoresins of capsicum | Oil of cassia |
| Oleoresins of ginger | Oil of nutmeg |
| Oil of pimenta | Oil of cardamon |
| Oil of sage | Oil of cloves |
| Oil of corriander | |

It is to be understood that the invention is not to be considered as limited to the materials specifically described nor to the proportions specifically given. Various modifications, changes and substitutions may be made without departing from the spirit and scope of the invention as expressed in the appended claims.

I claim:

1. A solid powdered condiment comprising in an intimate admixture a major quantity of a finely divided vehicle, a small quantity of volatile flavoring ingredients, a hygroscopic agent, and a fixative in the nature of a non-volatile oil capable of holding flavoring ingredients.

2. A solid powdered condiment comprising in an intimate admixture a major quantity of powdered sugar as a vehicle, a small quantity of volatile flavoring ingredients, a hygroscopic agent, and a fixative in the nature of a non-volatile oil capable of holding flavoring ingredients.

3. A solid powdered condiment comprising in an intimate admixture a major quantity of powdered sugar as a vehicle, a small quantity of flavoring oils, a liquid hygroscopic agent, and a fixative in the nature of a non-volatile oil capable of holding a flavoring oil.

4. A solid powdered condiment comprising in an intimate admixture a major quantity of powdered sugar as a vehicle, a small quantity of flavoring materials including oils and oleoresins of spices, a liquid hygroscopic agent, and a fixative in the nature of a non-volatile oil capable of holding said flavoring materials.

5. A solid powdered condiment comprising in an intimate admixture about 100 parts of powdered sugar as a vehicle, and up to about 8 parts of liquid material carried by said sugar, said liquid material containing volatile flavoring ingredients, a hygroscopic liquid, and a non-volatile oil.

6. A solid powdered condiment comprising in an intimate admixture about 100 parts of powdered sugar as a vehicle, and up to about 8 parts of liquid material carried by said sugar, said liquid material containing a major portion of volatile flavoring materials and a minor portion of a mixture of a hygroscopic liquid and a non-volatile oil.

7. A solid powdered condiment comprising in an intimate admixture a major quantity of a finely divided water-soluble solid vehicle, a small quantity of volatile flavoring ingredients, a hygroscopic agent, and a fixative in the nature of a non-volatile oil incapable of dissolving the vehicle and capable of holding the flavoring ingredients.

8. A solid powdered condiment comprising in an intimate admixture a major quantity of milk powder, a small quantity of volatile flavoring ingredients, a hygroscopic agent, and a small quantity of non-volatile oil capable of holding said flavoring ingredients.

9. A solid condiment comprising in an intimate admixture a major quantity of milk powder, a small quantity of flavoring liquid carried by said powder, said liquid including volatile flavoring ingredients, a hygroscopic liquid, and a non-volatile oil.

10. A solid condiment comprising in an intimate admixture a major quantity of a powdered edible vehicle, and a small quantity of liquid carried by said vehicle, said liquid including volatile flavoring materials, glycerine, and corn oil as a fixative for the flavoring materials.

11. A solid condiment comprising in an intimate admixture a major quantity of a powdered edible vehicle, and a small quantity of liquid carried by said vehicle, said liquid including a major quantity of volatile flavoring material, and a minor quantity of other liquids, which other liquids include a minor quantity of hygroscopic liquid, and a minor quantity of non-volatile fixative oil.

12. A solid condiment comprising in an intimate mixture, a major quantity of a powdered edible vehicle, and a minor quantity of liquid carried thereby, said liquid having therein non-volatile fixative oil, a larger amount of hygroscopic glycolic substance, and volatile flavoring substances.

13. A solid condiment comprising powdered sugar, a small quantity of volatile flavoring substance, a small quantity of edible non-volatile fatty fixative agent in which volatile flavoring substance is soluble, and a small quantity of an edible hygroscopic substance.

14. A solid condiment comprising powdered sugar, a small quantity of volatile flavoring substance, a small quantity of edible non-volatile fatty fixative agent in which volatile flavoring substance is soluble, and a small quantity of glycerin.

15. A solid condiment comprising powdered edible solid particles, a quantity of volatile flavoring substance, a small quantity of edible non-volatile fatty fixative agent in which volatile flavoring substance is soluble, and a small quantity of an edible hygroscopic substance.

CARROLL L. GRIFFITH.

CERTIFICATE OF CORRECTION.

Patent No. 1,971,910.    August 28, 1934.

CARROLL L. GRIFFITH.

It is hereby certified that error appears in the printed specification of the above numbered patent requiring correction as follows: Page 3, lines 116 and 117, claim 11, strike out the words "a minor quantity of"; and line 123, claim 12, strike out the words "a larger amount of"; and that the said Letters Patent should be read with these corrections therein that the same may conform to the record of the case in the Patent Office.

Signed and sealed this 9th day of October, A. D. 1934.

Leslie Frazer (Seal)    Acting Commissioner of Patents.